July 1, 1958  J. P. SPRONKEN  2,841,098
VISCOUS INGREDIENT DISPENSING APPARATUS
Filed Sept. 21, 1956  3 Sheets-Sheet 1

INVENTOR.
JACQUES P. SPRONKEN
BY
McMorrow, Berman + Davidson
ATTORNEYS

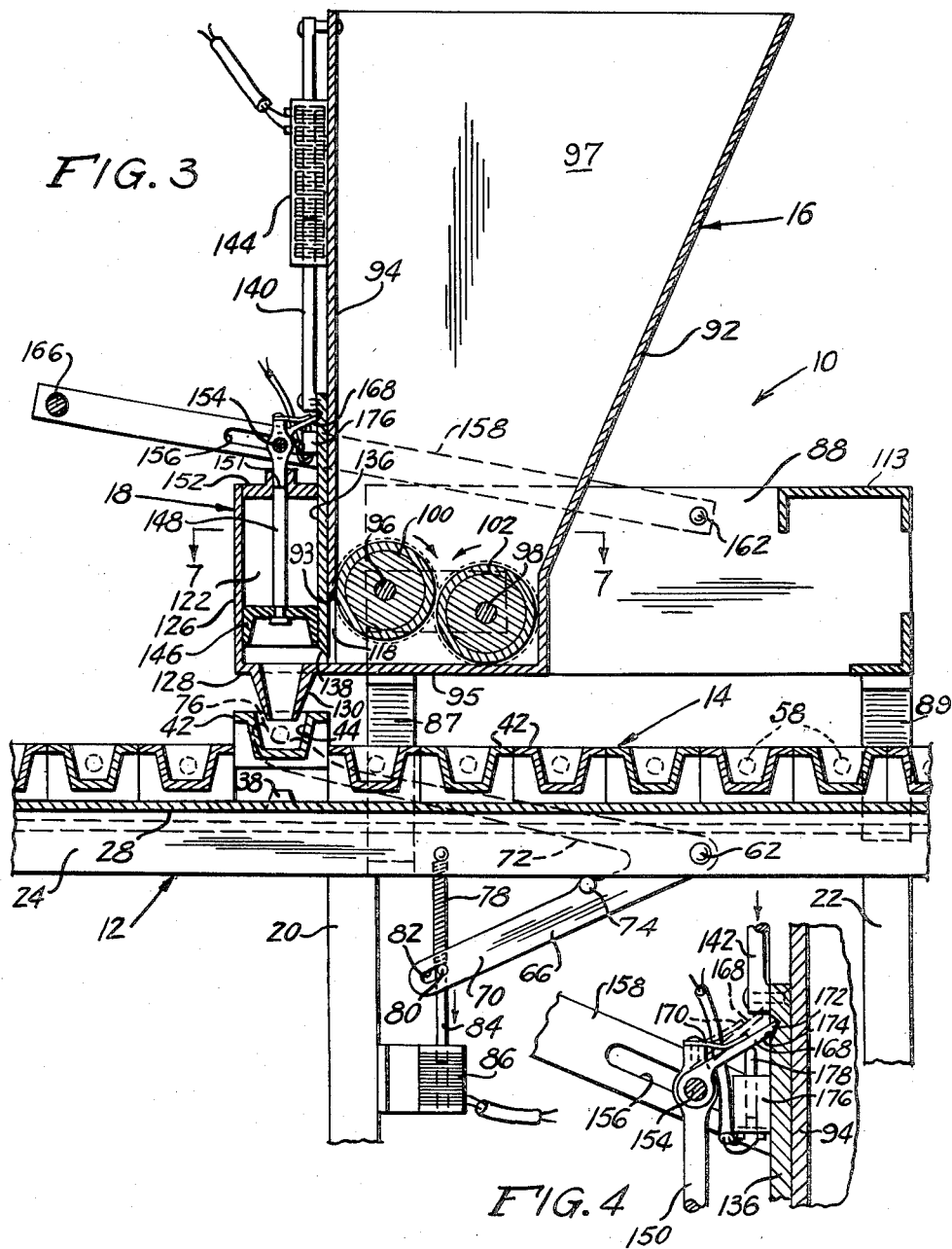

July 1, 1958 — J. P. SPRONKEN — 2,841,098
VISCOUS INGREDIENT DISPENSING APPARATUS
Filed Sept. 21, 1956 — 3 Sheets-Sheet 3

INVENTOR.
JACQUES P. SPRONKEN
BY
McMorrow, Berman & Davidson
ATTORNEYS

United States Patent Office 2,841,098
Patented July 1, 1958

2,841,098

VISCOUS INGREDIENT DISPENSING APPARATUS

Jacques Paul Spronken, Berkeley, Calif.

Application September 21, 1956, Serial No. 611,166

7 Claims. (Cl. 107—8)

This invention relates to improved apparatus for dispensing fixed amounts of viscous material, such as cream fillings for chocolate candies and the like into individual mold cavities.

The primary object of the invention is to provide a more practical and efficient apparatus of this kind, which is of simplified construction, and is composed of a small number of easily assembled parts.

Another object of the invention is to provide apparatus of this character indicated which can be made in rugged and serviceable forms at relatively low cost, can be easily and economically operated, and is highly practical and efficient for the purpose intended.

These together with other objects and advantages which will become apparent reside in the detail of construction and operation as more fully hereinafter described and claimed, reference being had to the accompanying drawings forming a part hereof, wherein like numerals refer to like parts throughout, and in which:

Figure 3 is an enlarged fragmentary vertical longitudinal sectional view taken substantially on line 3—3 of Figure 1, showing a mold section of the mold assembly of the apparatus elevated to a position to be filled with viscous material;

Figure 4 is a further enlarged fragmentary side elevational view of a portion of Figure 2, showing in full lines and in dotted lines different operated positions of cooperating parts;

Figure 1:
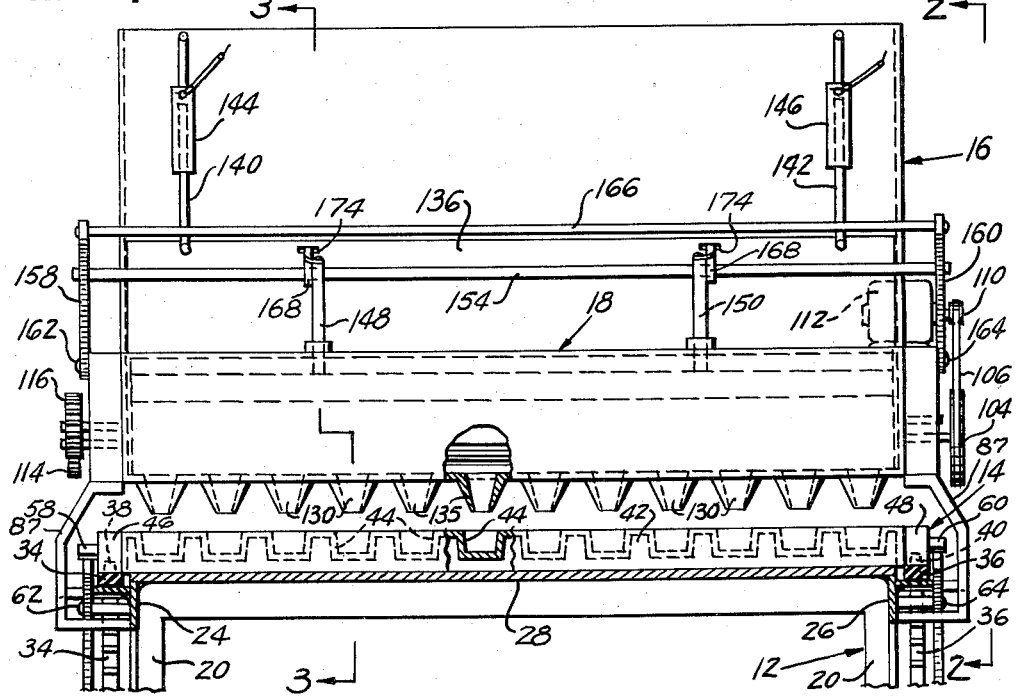
Figure 1 is a front end elevational view of the dispensing apparatus of the present invention, portions being broken away and in section.

Referring to the drawings in detail, the illustrated apparatus, indicated generally at 10, comprises a support 12, a horizontal mold assembly 14 thereon, and a dispensing assembly 16.

The support 12 includes suitable legs 20 and 22 adapted to rest upon a support surface and depending from side flanges 24 and 26 of a horizontal support plate 28. Suitably journaled on rear end portions of the support 12 are drive pulleys 30 and 32, having trained thereover flexible belts 34 and 36, respectively, which have on the outer sides thereof spaced lugs 38 and 40, respectively.

Figure 6:
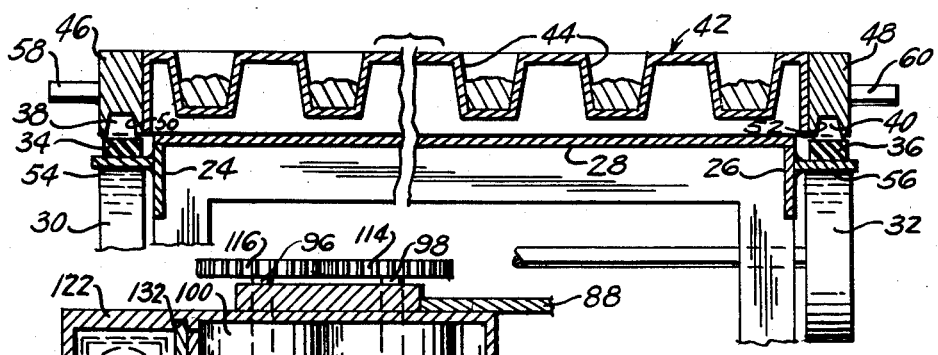
Figure 6 is an enlarged fragmentary vertical transverse sectional view taken substantially on line 6—6 of Figure 2.

The mold assembly 14 comprises a plurality of independent transversely elongated mold sections 42, see Figure 3, which extend across the support plate 28, each having therealong a plurality of separated upwardly opening mold cavities 42. The mold sections 42 have blocks 46 and 48 on their opposite ends, see Figure 6, which have in their lower edges downwardly opening recesses 50 and 52, respectively, into which are engageable the lugs 38 and 40 of the flexible belts 34 and 36, so that rotation of the belts causes forward movement of the mold assembly sections along the upper side of the plate 28, beneath the dispensing assembly 16. The side flanges 24 and 26, see Figure 6, have extending laterally outwardly rails 54 and 56, upon which the upper flights of related belts 34 and 36 are supported.

The blocks 46 and 48 on the ends of individual mold sections 42 have extending laterally outwardly therefrom trunnions 58 and 60 for engagement by means for independently elevated mold sections as hereinafter described.

At a point rearwardly of the dispensing assembly 16, reclining V-shaped levers 66 and 68 are pivoted at 62 and 64, at their apices, to the outer sides of the support side flanges 24 and 26. The levers 66 and 68 each has a lower arm 70 and an upper arm 72 extending transversely between and secured to the upper edges of the lower arms 70 of the levers 66 and 68 is a stop rod 74 arranged to engage the lower edges of the side flanges 24 and 26 to limit upward movement of the levers 66 and 68, as seen in Figure 3.

The upper lever arms 72 terminate at their forward ends in upwardly opening notches 76 which are engageable with the trunnions 58 and 60 of the mold sections for elevating the same beneath the dispensing assembly 16. Stretched between the support side flanges 24 and 26 and pins 80 engaged in longitudinal slots 82 in the forward ends of the lower lever arms 70, are helical springs 78, serving to urge the levers upwardly about the pivots 62 and 64, so that individual mold sections 42 are held in elevated positions, as seen in Figure 3. When the mold cavities of a mold section have been filled with dispensed material, the weight of the material is sufficient to depress the filled and elevated mold section onto the support plate 28 against the resistance of the springs 78. In order to assure this action, the pins 80 in the slots 82 of the lower lever arms 70 have secured thereto depending armature rods 84 disposed within solenoids 86 which, when energized, cause the above described downward movement of elevated mold sections.

Longitudinally spaced brackets 87 and 89 secured to related support side flanges 24 and 26 have mounted thereon vertical longitudinal support plates 88 and 90, having extending transversely therebetween an upwardly opening hopper 92 for viscous material. The hopper 92 includes a forward vertical wall 94 having a lower edge 93 spaced upwardly from its bottom wall 95 and defining a dispensing or discharge opening. Extending through the opposite side walls 97 of the hopper 92 are front and rear shafts 96 and 98 which have thereon rollers 100 and 102, respectively, which extend substantially the entire width of the interior of the hopper 92. The rollers 100 and 102 are in cooperating relationship, and the front roller 100 is elevated relative to the rear roller 102, which works near the hopper bottom 95.

Figure 2:
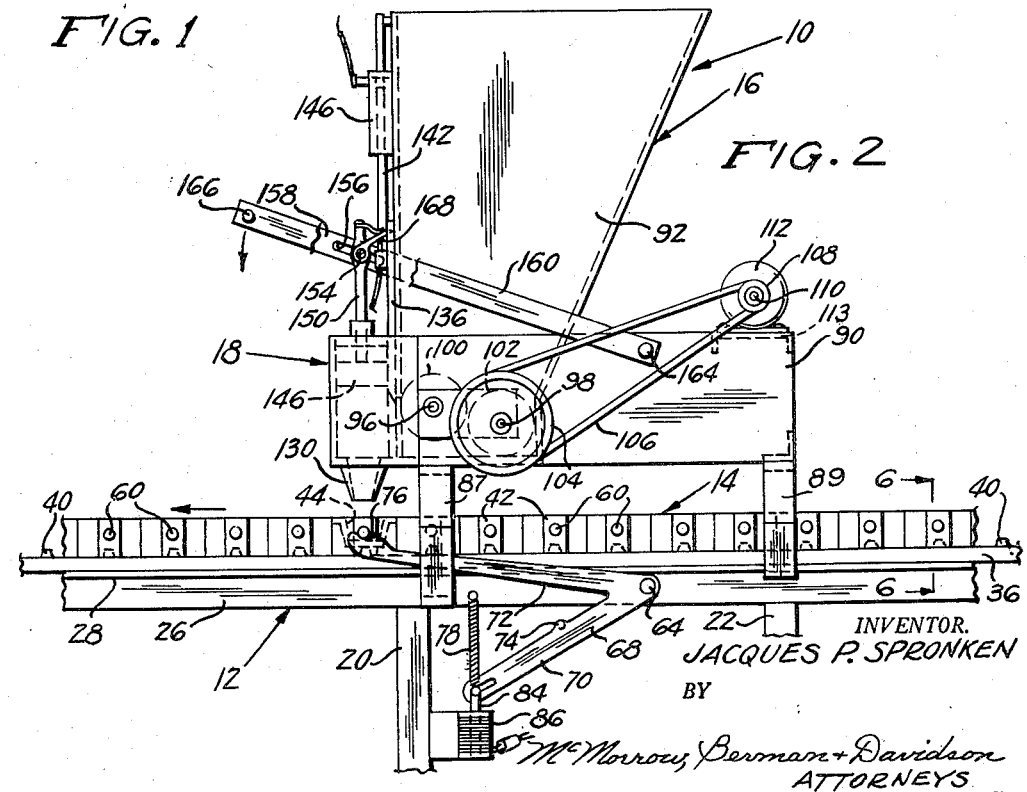
Figure 2 is a fragmentary side elevational view of the apparatus, portions being broken away and taken substantially on line 2—2 of Figure 1.

The rear shaft 98 extends laterally outwardly beyond one side of the hopper 92 and has suitably secured thereon a pulley 104, see Figure 2, which has trained thereover a flexible drive belt 106 which is also trained over a a drive pulley 108 on the shaft 110 of such as an electric motor 112, mounted, as indicated at 113, on the support plates 88 and 90, behind the hopper 92. The other end of the rear shaft 98 and the related end of the front shaft 96 extend beyond the opposite side of the hopper 92 and have thereon meshed gears 114 and 116, respectively, whereby simultaneous rotation of the shafts 98 and 96 in opposite directions obtains, so that viscous material within the hopper 92 is urged downwardly and forwardly out of the discharge opening 118 beneath the edge 93 of the hopper front wall 94.

Mounted on the forward side of the front wall 94 of the hopper 92 is an extruding assembly generally designated 18, which comprises a narrow, transversely elongated housing 19, whose end walls are constituted by forward extensions 122 and 124 of the hopper side walls 97, a vertical front wall 126, a bottom wall 128, and a vertical back wall which is constituted by the hopper front wall 94. The bottom wall 128 has therealong transversely spaced depending discharge nozzles 130, which are arranged to register with mold cavities 44 of mold sections 42 positioned beneath the extruding assembly 18.

Figure 7:
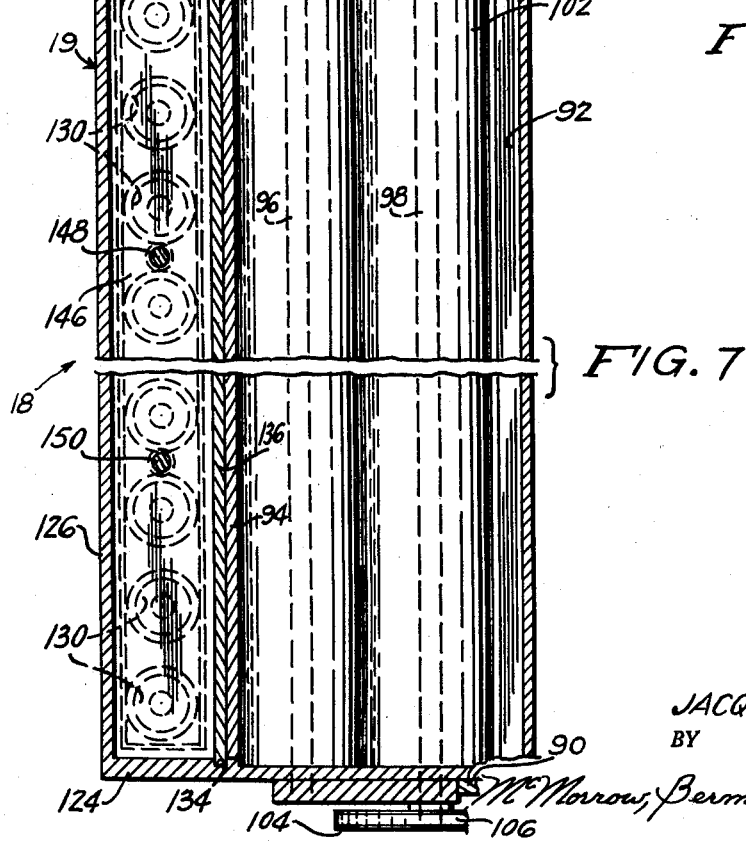
Figure 7 is an enlarged fragmentary and contracted horizontal sectional view taken substantially on line 7—7 of Figure 2.

As most clearly shown in Figure 7, the extruding assembly housing side walls 122 and 124 have vertical grooves 132 and 134 in their inward sides which are located close to the front wall 94 of the hopper 92, in which are slidably confined the opposite side edges of a vertically reciprocable gate plate 136 which has a sharpened or beveled lower edge 138 which functions to cut off viscous material flowing from the hopper 92 into the housing 19 through the discharge opening 118 when the gate plate 136 is lowered.

The gate plate 136 has secured in spaced relationship on the upper edge thereof armature rods 140 and 142, see Figure 1, disposed in solenoids 144 and 146, respectively, secured on the forward side of the front wall 94 of the hopper 92. The solenoids incorporate spring means for urging the gate plate 136 downwardly into closing relationship to the discharge opening 118.

Working vertically in the extruding housing 19 is a piston 146, as shown in Figure 3, which has extending upwardly therefrom spaced piston rods 148 and 150 extending through openings 151 in the top wall 152 of the housing 19. Extending transversely through the piston rods 148 and 150 above the housing 19 is a transverse rod 154, opposite ends of which are engaged in longitudinally elongated lost motion slots 15 in longitudinal arms 158 and 160 of actuating means for the piston 146. The arms 158 and 160 are located at opposite sides of the hopper 92 and are pivotally mounted at their rear ends by pivots 162 and 164, respectively, on the support plates 88 and 90, respectively. Extending between and secured to the forward ends of the arms 158 and 160 is a rod 166 constituting a handle for depressing the arms 158 and 160, so as to depress the piston 146 and extrude viscous material in the housing 19 through the discharge nozzle 130.

Rotatably supported on the transverse rod 154 adjacent the piston rods 148 and 150 are latches 168, clearly shown in Figure 4. Suitably secured on the upper ends of the piston rods 148 and 150 are one end of leaf spring 170, whose free ends overlie the latches 168. The terminal ends 172 of the latches 168 are arranged to engage in notches 174 in the forward side of the gate plate 136, only in the depressed position of the gate plate. Secured on the forward side of the gate plate 136 below the notches 174 are solenoids 176 having upwardly extending armature rods 178 which are engageable with the undersides of the latches 168, for displacing the latches out of the notches, when energized.

When the piston 146 has been depressed to the position shown in Figure 3, the latches 168 engage in the notches 174 in the gate plate 136. Upward movement of the arms 158 and 160 then results in simultaneous elevation of the piston 146 and the gate plate 136. When the gate plate 136 is in elevated position, the rollers 100 and 102, which have been mixing the viscous material within the hopper 92, serve to force the viscous material into the extruding housing 19. After the piston 146 and the gate plate 136 have been elevated, the solenoids 176 are actuated so as to urge the latches 168 to the disengaged dotted line positions shown in Figure 4, so that the gate plate 136 can be again depressed, as shown in Figure 3. The piston 146, being in its elevated position, as shown in Figure 2, downward manual pressure on the handle rod 166 causes the piston 146 to descend and extrude viscous material through the nozzles 130, into mold cavities 44 of an underlying mold section 42.

Figure 5:
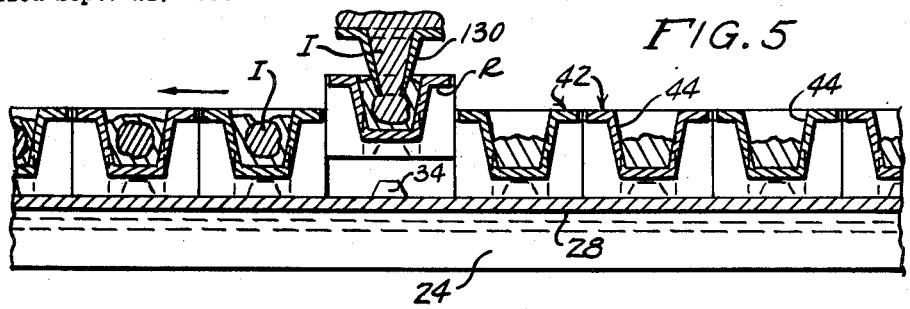
Figure 5 is a fragmentary vertical longitudinal section taken through the mold assembly, showing the manner in which filled center chocolate creams are formed.

As shown in Figure 5, the mold cavities 44 of mold sections 42 to the left of the discharge nozzles 130 have therein quantities of liquid chocolate into which viscous material I as been extruded, in the manner indicated in the elevated mold section R. By virtue of rotation of the belts 38 and 40 after the elevated mold section R has been lowered, the mold section R is moved forwardly beyond the discharge nozzles 130, whereat the liquid chocolate or the like forms around the deposits of extruded viscous material, so as to form filled center chocolate candies.

The foregoing is considered as illustrative only of the principles of the invention. Since numerous modifications and changes will readily occur to those skilled in the art, it is not desired to limit the invention to the exact construction and aporation shown and described, and accordingly, all suitable modifications and equivalents may be resorted to, as fall within the scope of the appended claims.

What is claimed is:

1. In viscous material dispensing apparatus of the type involving a forwardly movable mold assembly composed of separate mold sections having mold cavities therein, support means having side portions adapted to be positioned along opposite sides of a mold assembly and to extend thereabove, a dispensing assembly mounted on and between said side portions, said dispensing assembly comprising a viscous material containing hopper having side walls, a bottom wall arranged to be spaced above a mold assembly and a vertical front wall having a forward side, said vertical front wall having a lower edge spaced upwardly from said bottom wall so as to define therewith a transversely elongated discharge opening, front and rear transverse rollers extending between and journaled in said side walls, said rollers being in cooperating relationship with the rear roller working close to said bottom wall and said front roller being elevated above said bottom wall, means connecting said rollers together for rotation in opposite directions and means for driving the rollers to force viscous material in the hopper forwardly through said discharge opening, an extruding housing mounted on the forward side of the hopper front wall and communicating with said hopper through said discharge opening and into which viscous material is forced from said discharge opening, said extruding housing having a top wall and a bottom wall, piston rod means working through said top wall, a piston working within said housing and secured to said piston means, said housing bottom wall having discharge nozzle means depending therefrom, and piston operating means for said piston.

2. In viscous material dispensing apparatus of the type involving a forwardly movable mold assembly composed of separate mold sections having mold cavities therein, support means having side portions adapted to be positioned along opposite sides of a mold assembly and to extend thereabove, a dispensing assembly mounted on and between said side portions, said dispensing assembly comprising a viscous material containing hopper having side walls, a bottom wall arranged to be spaced above a mold assembly and a vertical front wall having a forward side, said vertical front wall having a lower edge spaced upwardly from said bottom wall so as to define therewith a transversely elongated discharge opening, front and rear transverse rollers extending between and journaled in said side walls, said rollers being in cooperating relationship with the rear roller working close to said bottom wall and said front roller being elevated above said bottom wall, means connecting said rollers together for rotation in opposite directions and means for driving the rollers to force viscous material in the hopper forwardly through said discharge opening, an extruding housing mounted on the forward side of the hopper front wall and communicating with said hopper through said discharge opening and into which viscous material is forced from said discharge opening, said extruding housing having a top wall and a bottom wall, piston rod means working through said top wall, a piston working within said housing and secured to said piston means, said housing bottom wall having discharge nozzle means depending therefrom, and piston operating means for said piston, said extruding housing having side walls having vertical grooves therein close to the hopper front wall, a vertical gate plate having side edges slidably confined in said grooves, said gate plate having a lower edge arranged to pass the lower edge of the hopper front wall and close said discharge opening when the gate plate is depressed, and connecting means for operatively connecting said gate plate at times to said operating means.

3. In viscous material dispensing apparatus of the type involving a forwardly movable mold assembly composed of separate mold sections having mold cavities therein, support means having side portions adapted to be positioned along opposite sides of a mold assembly and to extend thereabove, a dispensing assembly mounted on and between said side portions, said dispensing assembly comprising a viscous material containing hopper having side walls, a bottom wall arranged to be spaced above a mold assembly and a vertical front wall having a forward side, said vertical front wall having a lower edge spaced upwardly from said bottom wall so as to define therewith a transversely elongated discharge opening, front and rear transverse rollers extending between and journaled in said side walls, said rollers being in cooperating relationship with the rear roller working close to said bottom wall and said front roller being elevated above said bottom wall, means connecting said rollers together for rotation in opposite directions and means for driving the rollers to force viscous material in the hopper forwardly through said discharge opening, an extruding housing mounted on the forward side of the hopper front wall and communicating with said hopper through said discharge opening and into which viscous material is forced from said discharge opening, said extruding housing having a top wall and a bottom wall, piston rod means working through said top wall, a piston working within said housing and secured to said piston means, said housing bottom wall having discharge nozzle means depending therefrom, and piston operating means for said piston, said extruding housing having side walls having vertical grooves therein close to the hopper front wall, a vertical gate plate having side edges slidably confined in said grooves, said gate plate having a lower edge arranged to pass the lower edge of the hopper front wall and close said discharge opening when the gate plate is depressed, and connecting means for operatively connecting said gate plate at times to said operating means, said operating means comprising arms having rear ends pivoted on said support side portions behind said hopper and forward ends, and a handle rod extending between and secured to said forward ends of said arms, a transverse rod secured to said piston rod means above the extruding housing and extending between said arms, and lost motion means operatively connecting said transverse rod to said arms.

4. In viscous material dispensing apparatus of the type involving a forwardly movable mold assembly composed of separate mold sections having mold cavities therein, support means having side portions adapted to be positioned along opposite sides of a mold assembly and to extend thereabove, a dispensing assembly mounted on and between said side portions, said dispensing assembly comprising a viscous material containing hopper having side walls, a bottom wall arranged to be spaced above a mold assembly and a vertical front wall having a forward side, said vertical front wall having a lower edge spaced upwardly from said bottom wall so as to define therewith a transversely elongated discharge opening, front and rear transverse rollers extending between and journaled in said side walls, said rollers being in cooperating relationship with the rear roller working close to said bottom wall and said front roller being elevated above said bottom wall, means connecting said rollers together for rotation in opposite directions and means for driving the rollers to force viscous material in the hopper forwardly through said discharge opening, an extruding housing mounted on the forward side of the hopper front wall and communicating with said hopper through said discharge opening and into which viscous material is forced from said discharge opening, said extruding housing having a top wall and a bottom wall, piston rod means working through said top wall, a piston working within said housing and secured to said piston means, said housing bottom wall having discharge nozzle means depending therefrom, and piston operating means for said piston, said extruding housing having side walls having vertical grooves therein close to the hopper front wall, a vertical gate plate having side edges slidably confined in said grooves, said gate plate having a lower edge arranged to pass the lower edge of the hopper front wall and close said discharge opening when the gate plate is depressed, and connecting means for operatively connecting said gate plate at times to said operating means, said operating means comprising arms having rear ends pivoted on said support side portions behind said hopper and forward ends, and a handle rod extending between and secured to said forward ends of said arms, a transverse rod secured to said piston rod means above the extruding housing and extending between said arms, and lost motion means operatively connecting said transverse rod to said arms, said connecting means comprising spring pressed latch means pivoted on said transverse rod having a terminal end, notch means on the gate plate with which the terminal end of the latch means is engageable only in a depressed position of the gate plate, and disengaging means on said gate plate engageable with the latch means for disengaging the latch means from the notch means, engagement of the terminal end of the latch means with the latch means serving to connect the gate plate to said arms for operation together with the piston.

5. In viscous material dispensing apparatus of the type involving a forwardly movable mold assembly composed of separate mold sections having mold cavities therein, support means having side portions adapted to be positioned along opposite sides of a mold assembly and to extend thereabove, a dispensing assembly mounted on and between said side portions, said dispensing assembly comprising a viscous material containing hopper having side walls, a bottom wall arranged to be spaced above a mold assembly and a vertical front wall having a forward side, said vertical front wall having a lower edge spaced upwardly from said bottom wall so as to define therewith a transversely elongated discharge opening, front and rear transverse rollers extending between and journaled in said side walls, said rollers being in cooperating relationship with the rear roller working close to said bottom wall and said front roller being elevated above said bottom wall, means connecting said rollers together for rotation in opposite directions and means for driving the rollers to force viscous material in the hopper forwardly through said discharge opening, an extruding housing mounted on the forward side of the hopper front wall and communicating with said hopper through said discharge opening, said extruding housing having a top wall and a bottom wall, piston rod means working through said top wall, a piston working within said housing and secured to said piston means, said housing bottom wall having discharge nozzle means depending therefrom, and piston operating means for said piston, said extruding housing having side walls having vertical grooves therein close to the hopper front wall, a vertical gate plate having side edges slidably confined in said grooves, said gate plate having a lower edge arranged to pass the lower edge of the hopper front wall and close said discharge opening when the gate plate is depressed, and connecting means for operatively connecting said gate plate at times to said operating means, and gate plate depressing means acting between the hopper front wall and the gate plate for depressing the gate plate independently of said operating means.

6. In apparatus of the character described, a horizontal support having side flanges and a horizontal support plate therebetween, rails projecting laterally outwardly from said side flanges, a mold assembly comprising a plurality of separate mold sections slidably supported upon said support plate for movement along the support, belts having upper flights resting upon and movable along said rails, and having means engaging individual mold sections for moving the mold sections along the support, said mold sections having trunnions on their ends, V-shaped lever having apices pivoted on said side flanges and having upper and lower arms having forward ends, the forward ends of the upper arm having notch means for engaging trunnions of a designated mold section for elevating such mold section above said support plate when said levers are pivoted in one direction, spring means acting between said lower lever arms and said support and yieldably urging the levers in said one direction, and depressing means acting between the forward end of said lower arms and said support for pivoting the levers in the opposite direction so as to depress the designated mold section from an elevated position to a depressed position on said support plate and disengaging the lever notch means from the trunnions of the designated mold section.

7. In apparatus of the character described, a horizontal support having side flanges and a horizontal support plate therebetween, rails projecting laterally outwardly from said side flanges, a mold assembly comprising a plurality of separate mold sections slidably supported upon said support plate for movement along the support, belts having upper flights resting upon and movable along said rails, and having means engaging individual mold sections for moving the mold sections along the support, said mold sections having trunnions on their ends, V-shaped levers having apices pivoted on said side flanges and having upper and lower arms having forward ends, the forward ends of the upper arm having notch means for engaging trunnions of a designated mold section for elevating such mold section above said support plate when said levers are pivoted in one direction, spring means acting between said lower lever arms and said support and yieldably urging the levers in said one direction, and depressing means acting between the forward end of said lower arms and said support for pivoting the levers in the opposite direction so as to depress the designated mold section from an elevated position to a depressed position on said support plate and disengaging the lever notch means from the trunnions of the designated mold section, said depressing means comprising solenoids on said support, and armature rod working in the solenoids and connected to the lower lever arms.

References Cited in the file of this patent
UNITED STATES PATENTS

| | | |
|---|---|---|
| 257,043 | Mitchell | Apr. 25, 1882 |
| 259,542 | Holmes | June 13, 1882 |
| 323,681 | Holmes | Aug. 4, 1885 |
| 323,682 | Holmes | Aug. 4, 1885 |
| 650,176 | Holmes | May 22, 1900 |
| 785,914 | Peters | Mar. 28, 1905 |
| 803,293 | Knorpp | Oct. 31, 1905 |